Patented July 21, 1931

1,815,811

UNITED STATES PATENT OFFICE

KÁLMÁN SZOMBATHY, OF KAKOSPALOTA, HUNGARY, ASSIGNOR OF ONE-THIRD TO PAUL SCHMITZ AND ONE-THIRD TO DOKTOR KORNELL KELL, BOTH OF DORTMUND, GERMANY

PROCESS FOR GAINING PURE, TARFREE SULPHUR FROM USED GAS-PURIFYING MASS

No Drawing. Application filed January 21, 1928, Serial No. 248,575, and in Germany January 22, 1927.

This invention is a novel process for recovering pure tarfree sulphur from spent gas-purifying material. It has heretofore been impossible to recover by means of a simple process the sulphur contained in used or spent gas-purifying material and the like in a pure, or particularly a tarfree condition. The hitherto employed processes have been too circumstantial and uneconomical, particularly in view of the low price of sulphur and since the sulphur recovered by the processes was impure. The sulphur heretofore recovered from spent gas-purifying material has moreover been so contaminated with tar that it has been necessary to sublimate the same.

Some years previous, a process was developed whereby sulphur, i. e. crude sulphur which is very nearly pure could be recovered in a finely divided or even colloidal condition, by treating sulphur with quick lime ($CaOh_2$) and sodium-sulphate ($Na_2SO_4$), whereby sulphate of calcium ($CaSO_4$) and sodium-polysulphide ($Na_xS_y$, f. i. $Na_2S_5$) and sodium thiosulphate ($Na_2S_2O_3$) were obtained. After filtering from the mixture sodium-polysulphide and sodium-thiosulphate and upon introduction of sulphurous acid ($SO_2$) sulphur was recovered, while the sodium-thiosulphate present was recovered as such in dry condition.

This process has however not been employed for treating gas-purifying material, and presumably could not be utilized for this purpose owing to the contamination of the gas-purifying material with tar, and for the same reason that pure sulphur could not be recovered by this process the other waste products, such as cyanogen and rhodanide combinations contained in the gas-purifying material could not be recovered.

By exhaustive experiments it has been ascertained that perfectly pure sulphur can not only be separated from spent gas-purifying material by treatment with burnt lime, or quick lime, under addition of alkaline carbonate, or alkaline sulphates, but also that by corresponding development of the process the present cyanogen and rhodanide combinations could be recovered, so that even the base of the gas-purifying material became suitable for re-employment.

My present process is as follows, the ground raw spent gas-purifying material is boiled with burnt lime ($CaO$), or quick lime ($Ca(OH)_2$), and simultaneously or subsequently an addition is made of alkaline sulphate, ($Na_2SO_4$), or a mixture of carbonate and sulphate. Other earth-alkaline oxides, or hydroxides, or similarly acting alkaline salts may be used. The sulphur is reduced by boiling to calcium-sulphide and is thereupon converted by addition of alkaline salts into alkaline polysulphides. After the conversion has been completed the formed calcium-carbonate or calcium-sulphate is precipitated, whereupon all impurities such as tar and other insoluble substances are passed over to the deposit. The alkaline polysulphides remain in solution as do also the alkaline ferro-cyanides and rhodanides, while the formed ammonia will escape.

The lye is thereupon drained off and in case the same should still contain traces of tar, which may occur when using very much polluted gas-purifying material, the lye is then boiled with animal charcoal.

Purification may also be effected by an admixture of animal charcoal and barium-sulphide ($BaS$), or by the introduction of sulphide of hydrogen, ($H_2S$). The remaining lye is drained off, or separated from the residue by filtering in a filterpress, anhydrous oxide ($SO_2$), anhydrous sulphuric acid ($SO_3$) or carbonic acid, ($CO_2$) being introduced until the poly-sulphides are mostly decomposed, i. e. until the sulphur is separated. The employment of sulphurous acid has given the best results.

The cyanogen combinations, still contained in the lye, are thereupon precipitated as substantially insoluble cyanogen combinations by means of iron salts, such as suspended ferric hydrate in neutral solution, or by earthy alkaline combinations such as chloride of calcium.

The remaining lye is further worked by repeating the introduction of gas until all alkaline salts are again converted into alkaline sulphates, or alkaline carbonates and until a superfluity of gas again prevails in the solution.

Rhodanide gases are finally separated from the rhodanide salts by the introduced gas and these gases are collected in milk of lime or other basic solutions. The gases required for decomposition can be obtained by calcination of the spent gas-purifying material or from the smoke-gases.

From the aforesaid it will be clear that working of the raw material is effected in one single operation, and that a circuitous process is set up utilizing the continuous exploitation of the supplied substances. In whatever form the sulphur constituent may be supplied, whether as elementary sulphur, as sulphurous acid, or as sulphide of hydrogen, it is finally recovered as pure sulphur; and the alkaline sulphates and carbonates, (lime in form of gypsum or chalk) are likewise recovered. Only the lime and carbonic acids are in fact consumed.

The recovered sulphur corresponds in quality to triple sublimated Sicilian sulphur; it is perfectly free from tar and ashes, is odorless, tasteless, and of a lively lemon-colored hue, is of extraordinary fine distribution, 96–98 degrees Chancel. When melted it has a lively yellow color, and will not form into balls even during prolonged storage.

1st example

Thirty parts of the spent gas-purifying material of usual composition (viz. containing approximately 32% sulphur and 2% cyanogen-combinations) are ground coarse-grained and mixed with 5 parts of burnt lime and 12 parts of waterless sulphate of sodium, (or 1 part calcined soda), and placed in a steam boiler with 5 parts by weight of water and heated to 100° C. The heated mixture is stirred by air, blown through the mixture by a pump. The mixture is boiled for about an hour, whereupon it will foam strongly, and the ammonia produced therein will simultaneously be drained off. After boiling for one hour the entire sulphur is reduced to sodium-polysulphide solution; and the separated calcium-carbonate and the calcium-sulphate deposit the impurities.

A sample is then taken in order to ascertain whether the lye is still polluted and particularly whether same still contains tar or other coloring impurities. The sample is mixed with sulphurous acid up to neutral re-action. The separated sulphur is filtered and dried, and melted at a temperature of 130 to 135° C. If it melts with a lively yellow color and looks otherwise clean the lye may immediately be worked further. If such is not the case, and the sulphur of the sample is brown, or it melts with a metallic gloss, the lye is then boiled with animal or bone charcoal, until a sample will yield pure sulphur. The addition of animal charcoal amounts as a maximum to only 1% of the material to be worked.

The lye is filtered and anhydrous acid introduced until the polysulphides are mainly decomposed and only about 0 to 2% remaining in the lye. The charge of anhydrous acid is then interrupted in order that the subsequently separating sulphur will not pollute the polysulphide sulphur already separated and in order that cyanogen combinations will not be carried along. The time for interrupting the gas supply can be ascertained calorimetrically with precision.

The separated polysulphide-sulphur is thereupon separated from the liquid by filtration, washed thoroughly with pure water, and dried at a temperature of about 80° C.

Upon the introduction of anhydrous sulphuric acid, sulphide of hydrogen is formed which is collected in a mixture of burnt lime and sodium-sulphate, or slacked lime. The thus formed sodium-sulphide, (sometimes sulph-hydrate) can further be used in the process. The lye remaining after removal of the polysulphide-sulphur is again treated with anhydrous sulphuric acid gas until a strong superfluity of gas is present in the lye, i. e. until all sodium-salts are again converted into sodium-sulphates.

The mother-lye is then mixed with iron salts in order to separate the cyanogen combinations therefrom which are worked in known manner. The rest of the lye may be used for cooling the sulphur-roasting-gases with the effect that as the colloidal thiosulphate separates from the lye sulphur is balled in consequence of being heated, and is deposited at the bottom. This second separation of sulphur is removed from the lye, and the remaining lye which only contains sodium-sulphate is again employed for the treatment of other masses of gas-purifying materials.

2nd example

Thirty parts of ground spent gas-purifying material of the same aforesaid composition are boiled for an hour with 5 parts of burnt lime, whereby the ammonia is expelled, the liquid is drawn off or filtered, and then mixed with 12 parts of calcined sodium-sulphate, or sodium-carbonate. Further treatment is the same as stated in the first example.

3rd example

The spent gas-purifying material is treated in the same manner as above stated and the formed alkaline polysulphides decomposed by carbonic acid gas, whereby sodium-carbonate is produced in the lye. Otherwise the process is exactly the same.

The principal advantage of the treatment with lime and alkaline sulphate, or alkaline carbonate, lies in the fact that the insoluble calcium-carbonates separated during re-action and the sulphates separate the tar and the iron-combinations from the lye.

It is likewise important that the gases, decomposing the polysulphates should not be introduced for too long a time, as otherwise a thiosulphate-formation (which must be prevented) would take place, and sulphur, which is separated from thiosulphate is not only of inferior quality but carries along the impurities remaining in the lye, owing to its strong absorbing and colloidal nature which renders same substantially valueless in my process.

I claim:

1. The process for recovering pure sulphur from spent gas-purifying material consisting in boiling the spent material with water and an excess of earth-alkali oxides to bring the sulphur into solution as an alkali polysulphide; filtering off the solution; treating the solution with acid gas for a sufficient time to decompose the polysulphide without formation of thiosulphates; and removing the sulphur by filtration.

2. In a process as set forth in claim 1, boiling the polysulphide solution with charcoal, before the introduction of the acid gas.

3. In a process as set forth in claim 1, repeating the treatment of the solution with the said acid gas until all the alkaline salts in the solution are converted into alkaline sulphates.

4. The process for recovering pure sulphur from spent gas-purifying material consisting in boiling 30 parts by weight of said spent material in 5 parts of water, and 5 parts of earth-alkali oxide; adding 12 parts of an alkaline salt to bring the sulphur into solution as an alkali polysulphide; filtering the solution; passing an anhydrous acid gas through the solution for a sufficient time to decompose the polysulphide without formation of thio-sulphates; and removing the sulphur by filtration.

5. In a process as set forth in claim 4, boiling the polysulphide solution with charcoal, before introduction of the acid gas.

6. In a process as set forth in claim 4, repeating the treatment of the solution with the said acid gas until all the alkaline salts therein are converted into alkaline sulphates.

7. The process for recovering pure sulphur from spent gas-purifying material consisting in boiling the spent material with water and an excess of an earth-alkali oxide to bring the sulphur into solution as an alkali sulphide; adding thereto an alkali sulphate to form an alkali polysulphide solution; filtering the solution containing the polysulphide; and treating the solution with anhydrous sulfurous acid gas to decompose the polysulphide without formation of thiosulphates; and finally separating the pure sulphur by filtration.

8. In a process as set forth in claim 7, boiling the polysulphide solution with bone charcoal, before introduction of the acid gas.

9. In a process as set forth in claim 7, repeating the treatment of the solution with the said acid gas until all the alkaline salts therein are converted into alkaline sulphates.

Dr. KÁLMÁN SZOMBATHY.